(12) United States Patent
Doerr et al.

(10) Patent No.: US 8,506,858 B2
(45) Date of Patent: Aug. 13, 2013

(54) PROCESS AND APPARATUS FOR THE AUTOMATIC MANUFACTURING OF DIFFERENT TORIC OPTICAL LENSES

(75) Inventors: Norbert Doerr, Griesheim (DE); Stefan Schmittner, Bessenbach (DE); Alfred Fischer, Niedernberg (DE); Peter Brotzmann, Obernburg (DE)

(73) Assignee: Novartis AG, Basel (CH)

( * ) Notice: Subject to any disclaimer, the term of this patent is extended or adjusted under 35 U.S.C. 154(b) by 361 days.

(21) Appl. No.: 12/754,672

(22) Filed: Apr. 6, 2010

(65) Prior Publication Data

US 2010/0258962 A1    Oct. 14, 2010

(30) Foreign Application Priority Data

Apr. 9, 2009  (EP) .................................... 09157707

(51) Int. Cl.
   *B29D 11/00*    (2006.01)
(52) U.S. Cl.
   USPC .............. 264/2.5; 264/2.1; 425/150; 425/808
(58) Field of Classification Search
   USPC ............ 264/1.1, 2.1, 2.2, 2.5, 40.3; 425/175, 425/808, 150, 183, 193
   See application file for complete search history.

(56) References Cited

U.S. PATENT DOCUMENTS

| | | | |
|---|---|---|---|
| 5,611,970 | A | 3/1997 | Apollonio |
| 5,916,494 | A | 6/1999 | Widman |
| 6,103,148 | A | 8/2000 | Su |
| 6,197,227 | B1 | 3/2001 | Appleton |
| 6,471,891 | B1 | 10/2002 | Cameron |
| 6,997,693 | B2 | 2/2006 | Hörner |
| 2003/0077350 | A1 | 4/2003 | Horner |
| 2006/0267225 | A1 | 11/2006 | Freson |

FOREIGN PATENT DOCUMENTS

| | | |
|---|---|---|
| WO | WO 98/42497 | 10/1998 |
| WO | WO 99/36803 | 7/1999 |

OTHER PUBLICATIONS

European Search Report dated Sep. 14, 2009 for Application No. 09157707.2.

*Primary Examiner* — Mathieu D. Vargot
(74) *Attorney, Agent, or Firm* — Robert Ambrose

(57) ABSTRACT

A process for the automatic manufacturing of different toric optical lenses having a front surface and a rear surface having a predetermined rotational orientation relative to one another, and with at least one of the front and rear surfaces having a toric portion, comprises forming a first toric lens by:
  introducing a starting material into a lens mold (3) comprising a male mold half (30) and a female mold half (31) defining a mold cavity between the shaping surfaces of the male and female mold halves, the shaping surfaces being arranged at a first rotational position relative to one another and at least one of them being toric, and
  curing the starting material in the mold cavity to form the first toric lens.
The process further comprises subsequently forming a second toric lens different from the first toric contact lens using the same male and female mold halves (30,31) by
  rotating the first and second mold halves (30,31) relative to one another so as to be arranged at a second rotational position relative to one another, and then forming the second lens in a similar manner. The step of rotating the male and female mold halves (30,31) relative to one another is performed automatically in the production line.

20 Claims, 3 Drawing Sheets

PROCESS AND APPARATUS FOR THE AUTOMATIC MANUFACTURING OF DIFFERENT TORIC OPTICAL LENSES

This application claims foreign priority under 35 U.S.C. §119 of European Patent Application No. 09157707.2 filed Apr. 9, 2009, incorporated by reference in its entirety.

BACKGROUND

The present invention relates to a process and an apparatus for the automatic manufacturing of different toric optical lenses. More specifically, the invention relates to the automatic manufacturing of different toric ophthalmic lenses, such as contact lenses.

It is known to produce optical lenses, in particular ophthalmic lenses such as contact lenses in a fully automated manufacturing process. One example for such a process is known, for example, from WO 98/42497. In this process, a plurality of molds—e.g. ten molds—are arranged in one mold carrier, each mold comprising a male mold half and a female mold half. The mold carrier comprises two mold carrier members in which the mold halves are arranged in two rows of five columns, respectively, the male mold halves being arranged in one of the mold carrier members and the female mold halves being arranged in the other mold carrier member. The two mold carrier members are pivotally connected with each other, and the molds can be closed by pivoting the one carrier member—e.g. that one carrying the male mold halves—about a pivot axis until the male mold halves arranged therein mate the corresponding female mold halves arranged in the other carrier member. Embodiments of the male and female mold halves which can be used in such a process are shown, for example, in WO 03/035376.

Toric contact lenses are well-known for the correction of astigmatism. However, due to the large varieties of astigmatism (in particular with respect to the relative position of the meridians as well as with respect to the amount of cylindrical corrective power), the number of one specific type of toric contact lens to be produced—i.e. of a contact lens having one specific relative position of the meridians and having one specific amount of cylindrical corrective power—is not as high as this is the case for contact lenses having only spherical corrective power. Accordingly, in the automatic manufacturing of toric contact lenses the shaping surfaces of the male and female mold halves defining the geometry and corrective power of the contact lens to be produced can only be used for producing a comparatively limited number of toric contact lenses of the same specific type.

Once the desired number of a specific type of toric contact lens has been produced and it is desired to produce a different specific type of toric contact lens the male and female mold halves have to be rotated relative to one another (assuming that only the rotational orientation of the male and female mold halves has to be changed). For that reason, the mold carriers have to be removed from the automatic production line in order to perform the desired relative rotation of the male and female mold halves. This rearrangement of the mold halves involves a significant expense, since the mold carriers have to be removed from the production line first and, accordingly, production has to be interrupted. The mold halves which are fixed in the respective members of the mold carriers removed from the production line then have to be released, rearranged (rotated relative to one another) and have to be precisely adjusted relative to one another again. After the rearrangement (relative rotation of the male and female mold halves) and the precise adjustment have been performed it is necessary to return the mold carriers to the production line and to run-in the rearranged molds on the production line under the conditions present in the production line (e.g. relative humidity, etc.), which means that a number of sample lenses have to be manufactured to make sure that the quality of the lenses produced with the rearranged molds is always satisfactory. These sample lenses must be discarded an cannot be distributed to consumers, and only after having performed the running-in of the rearranged molds on the production line, actual production of lenses using the rearranged molds can be resumed.

Accordingly, it is an object of the present invention to suggest a process and an apparatus which are suitable to prevent the afore-mentioned disadvantages and to allow comparatively low numbers of toric optical lenses of one specific type to be produced in an automatic lens manufacturing line and then to produce optical toric lenses, in particular toric ophthalmic lenses such as contact lenses, of a different type using the same molds.

SUMMARY

This object is achieved by a process according to the invention as it is defined by the features of the independent process claim. Further variants of the process according to the invention are the subject of the dependent process claims.

In particular, in accordance with the invention the process for the automatic manufacturing of different toric optical lenses, in particular ophthalmic lenses such as contact lenses, each lens having a front surface and a rear surface with the front and rear surfaces having a predetermined rotational orientation relative to one another, and with at least one of the front and rear surfaces having a toric portion, a first toric lens is formed by
 introducing a starting material into a respective lens mold comprising a male mold half and a female mold half defining a mold cavity between the shaping surfaces of the male and female mold halves, the shaping surfaces being arranged at a first rotational position relative to one another and at least one of them being toric, and
 curing the starting material in the mold cavity to form the first toric lens having front and rear surfaces having a first predetermined rotational orientation relative to one another.

Subsequently, a second toric lens different from the first toric contact lens is formed using the same male and female mold halves by
 rotating the first and second mold halves relative to one another so as to be arranged at a second rotational position relative to one another,
 introducing the starting material into the mold cavity defined between the shaping surfaces of the male and female mold halves, and
 curing the starting material in the mold cavity to form the second toric lens having front and rear surfaces having a second predetermined rotational orientation relative to one another;

wherein the step of rotating the male and female mold halves relative to one another from the first rotational position to the second rotational position is performed automatically in the production line.

The process according to the invention greatly reduces the expense when performing the rearrangement (rotation) of the male and female mold halves relative to one another, since this is performed automatically in the production line. Thus, it is neither necessary to interrupt production, to remove the respective mold carrier from the production line, to make the necessary precise adjustments after rearrangement of the male and female mold halves relative to one another, and to interrupt production again for returning the mold carrier with the rearranged and adjusted molds, nor is it necessary to perform any running-in of the rearranged molds to make sure that quality of the lenses produced using the rearranged molds is always satisfactory, since rearrangement of the molds is performed under the conditions of the production line. Accordingly, a running-in of the rearranged molds can be dispensed with. It is immediately clear, that this leads to a significant reduction of the expense when a changeover from one type of toric contact lens to a different type of contact lens is performed.

In one variant of the process according to the invention, a plurality of male and female mold halves is provided and wherein the step of rotating the first and second mold halves relative to one another comprises simultaneously rotating at least two male and female mold halves from the first rotational position to the second rotational position. This measure further improves efficiency of the process.

In one particular variant of this process, the male and female mold halves are arranged in two rows and a plurality of columns with the male and female mold halves of the same column being arranged at the same first rotational position, and the step of simultaneously rotating the male and female mold halves relative to one another comprises simultaneously rotating the male and female mold halves of the same column from the first rotational position to the second rotational position. Although it is generally conceivable that each mold provided in one mold carrier may be of different type when compared with the rest of the molds provided in the same mold carrier, typically the lenses produced with the molds of one column are of the same type. This also reduces the expense for the control unit of the production line, since it is only necessary to store and track information about the arrangement of the mold halves in a respective column in the mold carrier rather than for each single mold in the mold carrier. In particular, in case a plurality of mold carriers is used which have the same arrangement of molds in the columns of the different mold carriers, then the respective arrangement of molds must only be stored once, and the control unit using then only needs to track which lenses are produced in which column.

In a further variant of this process, the male and female mold halves are arranged in a mold carrier in two rows and five columns, and the step of simultaneously rotating the male and female mold halves relative to one another comprises simultaneously rotating all male mold halves and female mold halves arranged in the mold carrier. This measure still further improves efficiency of the process according to the invention.

In yet a further variant of the process according to the invention, at least one of the male and female mold halves of a mold is provided with an adapter member having means indicative of the rotational position of the shaping surface of the respective male or female mold half and engaging the respective male of female mold half, and the step of rotating the male and female mold halves relative to one another comprises engaging the adapter member and rotating it by a predetermined angle thus rotating the respective male or female mold half. This is a particular advantageous variant of the process from a constructional point of view, since it allows to use the existing molds and mold carriers without the need to make any significant constructional changes to the existing molds and mold carriers.

In accordance with the invention, the apparatus for the automatic manufacturing of different toric optical lenses, in particular ophthalmic lenses such as contact lenses, each lens having a front surface and a rear surface with the front and rear surfaces having a predetermined rotational orientation relative to one another, and with at least one of the front and rear surfaces having a toric portion, the apparatus comprises:

dispensing means for introducing a starting material into a respective lens mold comprising a male mold half and a female mold half defining a mold cavity between the shaping surfaces of the male and female mold halves, the shaping surfaces being arranged at a first rotational position relative to one another and at least one of them being toric, means for curing the starting material in the mold cavity to form a first toric lens having front and rear surfaces having a first predetermined rotational orientation relative to one another, and means for rotating the male and female mold halves relative to one another so as to be arranged at a second rotational position relative to one another after rotation, so that a second toric lens having front and rear surfaces having a second predetermined rotational orientation relative to one another can be manufactured using the same mold halves, wherein the means for rotating the male and female mold halves relative to one another from the first rotational position to the second rotational position are arranged such that rotation of the male and female mold halves relative to one another is performed automatically in the production line.

As to the advantages of the apparatus according to the invention, it is referred to the respective advantages already mentioned with respect to the process already discussed above.

In a specific embodiment of the apparatus according to the invention, the apparatus comprises a mold carrier for providing a plurality of male and female mold halves, and the means for rotating the first and second mold halves relative to one another comprise at least two rotating units for simultaneously rotating at least two male and female mold halves from the first rotational position to the second rotational position.

In a further embodiment of the apparatus according to the invention, the mold carrier is designed such that the male and female mold halves are arranged in two rows and a plurality of columns with the male and female mold halves of the same column being arranged at the same first rotational position, and the at least two rotating units for simultaneously rotating the male and female mold halves from the first rotational position to the second rotational position are arranged such that they are capable of rotating the male and female mold halves of the same column.

In a further embodiment of this apparatus the mold carrier is designed such that the male and female mold halves are arranged in the mold carrier in two rows and five columns, and the means for rotating the male and female mold halves relative to one another comprises ten rotating units for simultaneously rotating all male mold halves and female mold halves arranged in the mold carrier.

In a still further embodiment of the apparatus according to the invention, at least one of the male and female mold halves of a mold is provided with an adapter member having means indicative of the rotational position of the shaping surface of the respective male or female mold half and engaging the respective male or female mold half. The means indicative of the rotational position of the shaping surface of the respective male or female mold half are capable of getting engaged by corresponding engagement means provided at the means for rotating the male and female mold halves.

In a further embodiment of this apparatus the adapter member is an adapter ring, and wherein the means indicative of the rotational position of the shaping surface of the respective male or female mold half are recesses provided on the adapter ring at a position which is angularly displaced relative to the position where the adapter ring engages the respective male or female mold half, and wherein the corresponding engagement means are protrusions provided on the means for rotating the male and female mold halves mating into the recesses of the adapter ring. This is advantageous when the axial space left for the adapter ring is only small, since the adapter ring must be capable of getting engaged on one hand and on the other hand it must reliably transfer the respective rotational forces to the respective mold half, so that on the other hand a certain thickness is required for the adapter ring.

BRIEF DESCRIPTION OF THE DRAWINGS

Further advantageous aspects of the invention will become apparent from the following description of a detailed embodiment with the aid of the drawings, in which.

DETAILED DESCRIPTION

Figure 1:
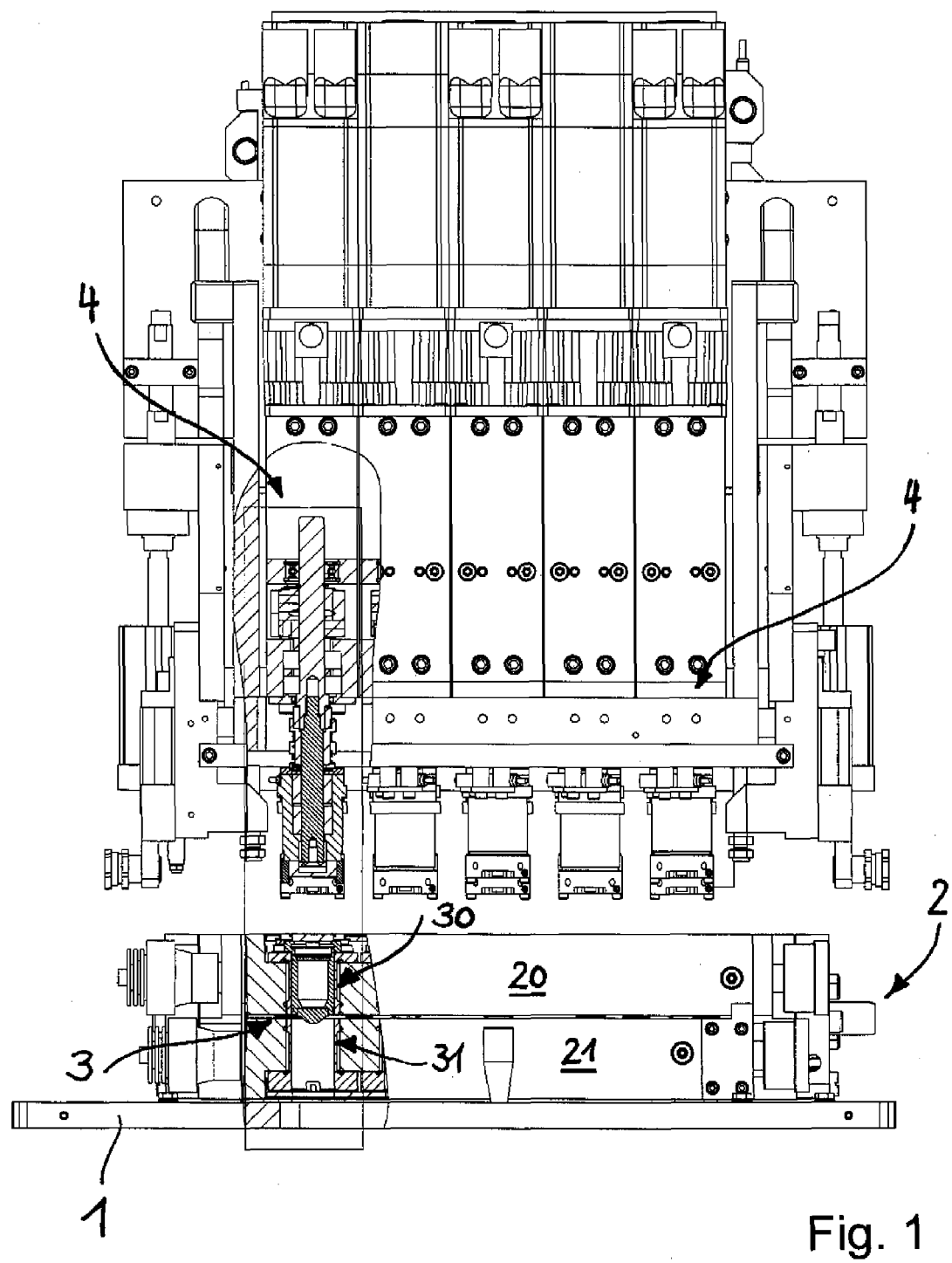
FIG. 1 shows a detail of a production line comprising an embodiment of the apparatus according to the invention.

In FIG. 1 a detail of a production line comprising an embodiment of the apparatus according to the invention is shown. On a support 1 there is shown a mold carrier 2 comprising a first mold carrier member 20 carrying a plurality of male mold halves 30 releasably clamped therein and a second mold carrier member 21 carrying a corresponding plurality of female mold halves 31 releasably clamped therein. First and second mold carrier members 20 and 21 are pivotally connected to one another. Mold carrier 2 and molds 3 comprising male mold halves 30 and female mold halves 31 are shown in their closed state. Although in the embodiment shown mold carrier 2 comprises a total of ten molds 3 arranged in two rows and five columns, only one male mold half 30 representing one mold 3 is shown for the sake of simplicity of the drawings.

Above mold carrier 2 ten rotating units 4 are arranged, with only five of them being visible in FIG. 1. For rotating the respective male mold half 30 arranged in first mold carrier member 20 relative to its corresponding female mold half 31 arranged in second mold carrier member 21, the respective rotating unit 4 has to be lowered until it engages the respective male mold half 30, as will be explained in more detail below. Once the rotating unit 4 has engaged the respective male mold half 30, clamping of male mold half 30 will be released thus allowing male mold half 30 to be rotated by a predetermined (azimuthal) angle relative to female mold half 31 which remains clamped in second mold carrier member 21. How this is performed will be explained in more detail below with reference to the drawings of FIGS. 2-5.

Figure 2:
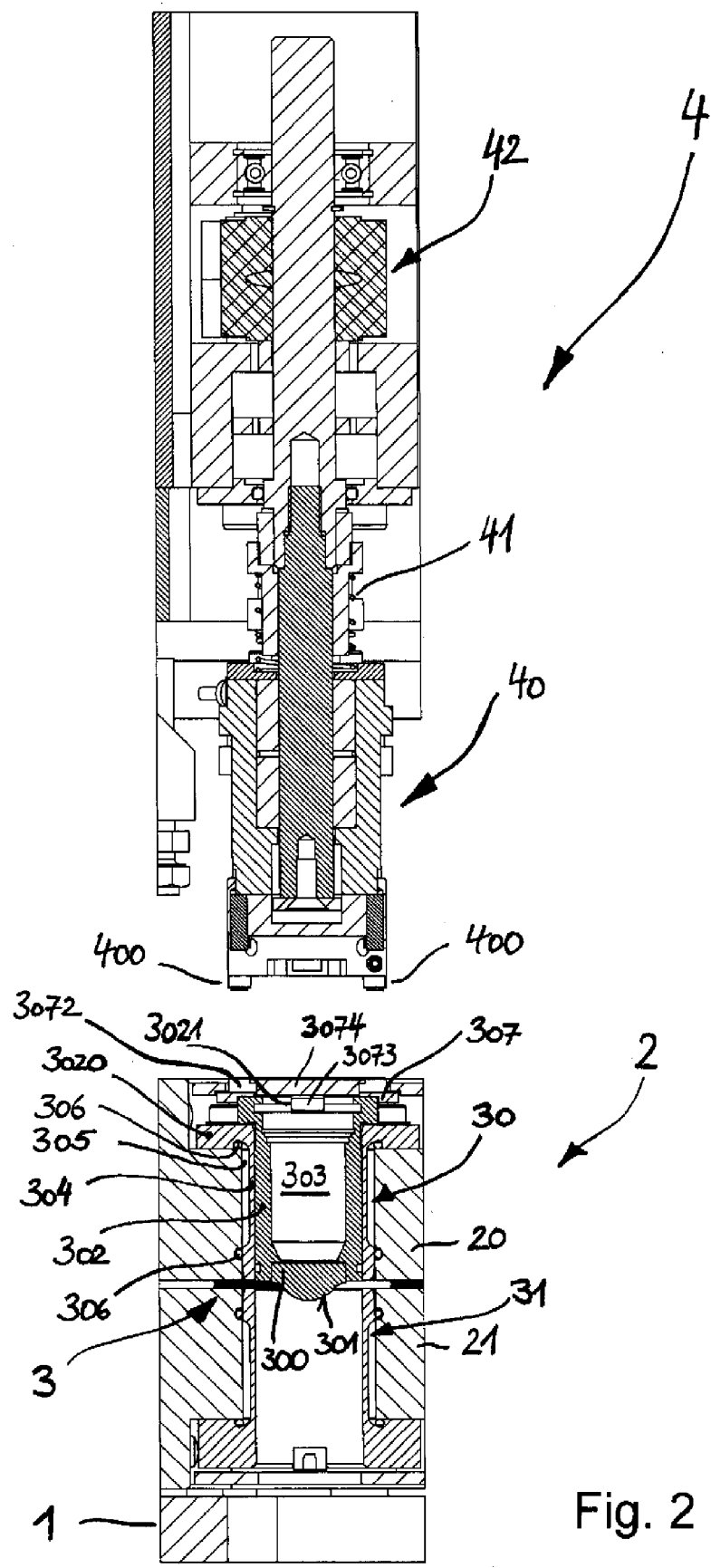
FIG. 2 shows the detail II of FIG. 1 in an enlarged sectional view.

FIG. 2 shows the detail bounded by the rectangular line II in FIG. 1 in an enlarged sectional view. Again, mold carrier 2 arranged on support 1 and comprising first mold half 20 and second mold half 21 can be seen, as well as mold 3 comprising male mold half 30 and female mold half 31. For the sake of consistency, only male mold half 30 is explicitly shown in detail. Male mold half 30 comprises a molding insert 300 having a toric shaping surface 301 defining the rear surface of the lens to be formed. Molding insert 300 is fixedly arranged in an essentially cylindrical mount 302 comprising a hollow inner passage 303 allowing radiation such as e.g. UV-light to pass therethrough and subsequently through molding insert 300 so as to impinge on the starting material contained in the mold cavity formed between the shaping surfaces 301 of the male mold half and of the shaping surface (not shown) of the corresponding female mold half 31, in order to cure the starting material to form the lens.

Cylindrical mount 302 is arranged in a cylindrical clamping sleeve 304 which is arranged in first mold carrier member 21 so as to define an annular chamber 305 which is sealingly closed by two O-rings 306. In order to clamp cylindrical mount 302 in which molding insert 302 is fixedly arranged a pressurized fluid, e.g. water, is introduced into annular chamber 305 through an inlet (not shown). The pressure of the fluid slightly deforms cylindrical clamping sleeve 304 to clamp cylindrical mount 302 which is practically non-deformable, at least not under the pressure of the fluid in annular chamber 305 which is typically in the range of 50 to 90 bar. To allow rotation of the male mold half 30 and in particular of the molding insert 300 which is fixedly arranged in cylindrical mount 302, the fluid pressure is released by allowing fluid to escape through an outlet (not shown), so that cylindrical mount 302 together with molding insert 300 and its shaping surface 301 can be rotated relative to female mold half 31.

Figure 3:
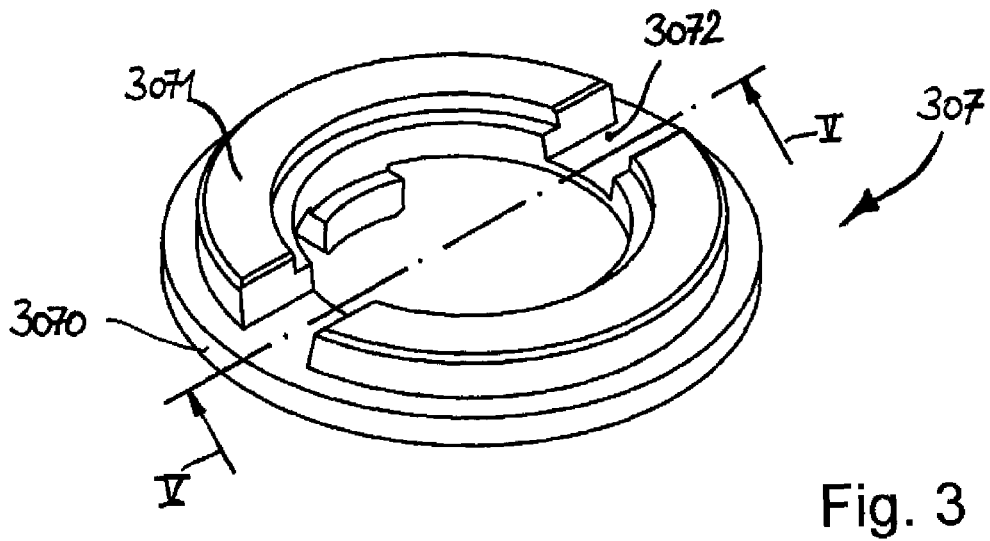
FIG. 3 shows an embodiment of an adapter ring of the apparatus according to the invention in a perspective top view.
Figure 4:
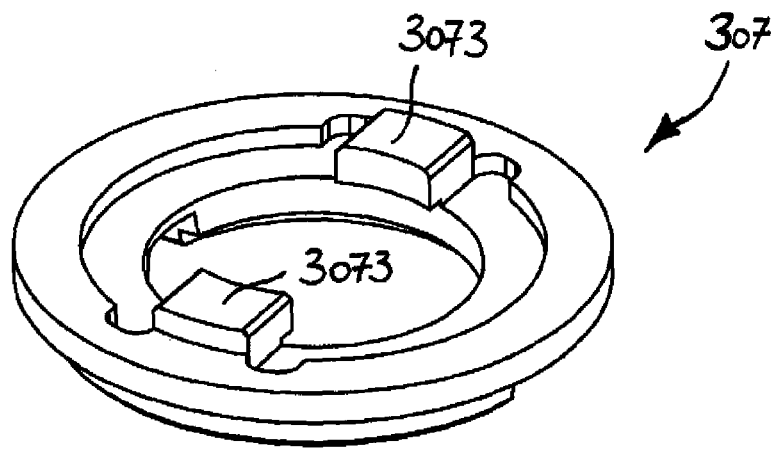
FIG. 4 shows the embodiment of the adapter ring of FIG. 3 in a perspective bottom view.
Figure 5:
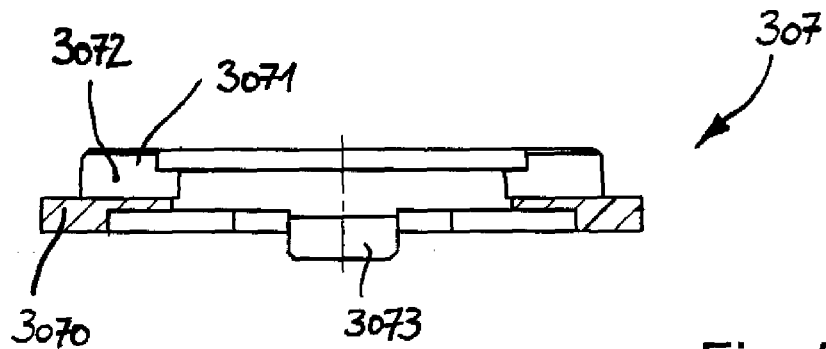
FIG. 5 shows a sectional view of the adapter ring of FIG. 3 along line V-V.

As can be seen further in FIG. 2 an adapter ring 307 is arranged on top of cylindrical mount 302. This adapter ring 307 is shown in more detail in FIGS. 3-5. FIG. 3 shows adapter ring 307 in a perspective view from above, FIG. 4 shows a perspective view from below, and FIG. 5 shows a sectional view along lines V-V in FIG. 3. In the following, adapter ring 307 will be described first to better understand how rotation of male mold half 30 can be performed by rotating adapter ring 307. As can be seen in FIG. 3 adapter ring 307 comprises an annular base 3070 from the upper surface of which an annular engagement rim 3071 extends upwardly. Engagement rim 3071 is interrupted by two oppositely arranged recesses 3072, which are adapted to matingly accommodate corresponding protrusions of a means for rotating the male mold half 30, as will be explained in more detail further below. From the lower surface of annular base 3070 two projections 3073 extend downwardly and radially inwardly, which matingly extend into corresponding recesses 3021 provided in a collar 3020 of cylindrical mount 302 (see FIG. 2). The respective position of the recesses 3072 is indicative of the rotational position of the shaping surface 301 of molding insert 300. As can be further seen from FIG. 3, the recesses 3072 are angularly displaced by 90° relative to the downwardly and radially inwardly extending projections 3073. This allows to keep the overall thickness of the adapter ring 307 small while at the same time providing a sufficient material thickness at the locations of the adapter ring 307 where the rotational force for rotating the male mold half 30 is transferred to cylindrical mount 302.

Turning back to FIG. 2, a cover plate 3074 transparent to the radiation for curing the starting material contained in the mold cavity formed between the male mold half 30 and the female mold half 31 is arranged in the center of adapter ring 307 and projections 3073 extend into corresponding recesses 3021 of collar 3020 of cylindrical mount 302. Rotating unit 4 shown in FIG. 2 comprises an engagement block 40 which—at its distal end—comprises two protrusions 400 for matingly engaging into the recesses 3072 of adapter ring 307. Engagement block 40 is axially movable against the force of a spring 41 and can be rotatably driven with the aid of a drive motor 42.

A toric contact lens should be positionally stable on the eye of the user in order to compensate for astigmatism. Therefore, means for enhancing positional stability of the lens when placed in the eye are usually provided on the lens, such as e.g. prism ballast, one or more slab-off portions, etc. For example, slab-off portions are usually provided on the front surface of the lens and, therefore, the angular or rotational position of the shaping surface of the female mold half 31 must be known to a control unit of the production line. Let us further assume that the toric surface for compensating the astigmatism is the rear surface of the lens. Accordingly, the position of the shaping surface 301 of the molding insert 300 of male mold half 30 must be known to the control unit of the production line, so that the meridians of the toric surface are arranged relative to the front surface at the desired angular position. For example, if the molding insert 300 can be inserted into cylindrical mount 302 only at one single specific angular position, then the angular position of the recesses 3021 provided in collar 3020 of cylindrical mount 302 is indicative of the angular position of the toric shaping surface 301 of molding insert 300 of male mold half 30. As a consequence, since the recesses 3072 of adapter ring 307 are angularly displaced by 90° relative to recesses 3021 provided in collar 3020 cylindrical mount 302, the angular position of the recesses 3072 are also indicative (representative) of the angular position of the toric shaping surface 301 of molding insert 301 of male mold half 30.

After a first toric lens has been produced using this relative arrangement of the shaping surfaces of the male and female mold halves 30,31 a second toric lens of different type is now to be produced. For that purpose, rotating unit 4 together with engagement block 40 has to be lowered to engage adapter ring 307 with the aid of protrusions 400 which are capable of matingly engaging into recesses 3072 of adapter ring 307. However, upon lowering rotating unit 4 together with engagement block 40 protrusions 400 are not necessarily arranged in the same angular position as are the recesses 3072 of adapter ring 307, so that upon lowering engagement block 40 protrusions first contact annular engagement rim 3071 of adapter ring 307. Further lowering of engagement block 40 results in compression of spring 41. As spring 41 is compressed, engagement block 40 s rotated either clockwise or anti-clockwise with the aid of drive motor 42 until the protrusions 400 reach a position corresponding to that of the recesses 3072 of adapter ring 307. At this moment, the resilient force of spring 41 forces protrusions 400 into recesses 3072 so that they matingly engage adapter ring 307. Spring 41 is still compressed to some extent, so that engagement block presses against the base 3070 of adapter ring 307 and thus against male mold half 30. At this time the pressure of the water in annular chamber 305 is released, so that cylindrical mount 302 is no longer clamped.

Drive motor 42 now rotates adapter ring 307 for a predetermined angle, so that male mold half 30 is rotated for the same angle, since projections 3073 matingly engage into recesses 3021 provided in collar 3020 of cylindrical mount 302. In this embodiment, female mold half 31 is not rotated at all. By rotation of male mold half 30 relative to female mold half 31, the relative movement of the male and female mold halves is achieved. After rotation of the male mold half 30 relative to female mold half 31 is completed, engagement block 40 still presses from above against adapter ring 307 and thus against male mold half 30. At this time, pressurized water is again introduced into annular chamber 305 so as to clamp cylindrical mount 302 in its new angular position. Rotating unit 4 together with engagement block 40 can then be raised again, and after the pressure of the fluid in the annular chamber 305 has been checked to have the desired pressure so that it is made sure that cylindrical sleeve 304 is deformed to clamp cylindrical mount 302, production of the second type of toric lens can start.

From the above described process and apparatus it is clear, that different types of contact lenses can be produced without having to remove the lens molds or mold carriers from the production line, which is highly advantageous as has been outlined further above. It is further to be mentioned, that the process and apparatus has been described with the aid of one specific embodiment, but that many variations are believed to be within the scope of the present invention. Only by way of example, it is immediately clear that is not only possible to rotate the male mold half and to hold the female mold half in its original position, but that it is possible as well to rotate the female mold half and to hold the male mold half in its original position or to rotate both the male and female mold half in order to achieve the relative rotation of the male and female mold halves from their first relative position to their second relative position. Also, it is possible to provide only one rotating unit or to provide two rotating units or to provide a number of rotating units arranged and corresponding to the number of molds in one mold carrier. Moreover, it is possible to rotate the mold halves by means other than an adapter ring. It is further to be noted, that it is possible to include an orientation mark in the lens so as to mark e.g. the 0° position, so that a user of a toric contact lens who wants to place the lens on the eye can do this with the lens having the correct orientation. For example, this orientation mark can be applied to the female mold half at the 0° position and can be pre-polymerized at this location prior to introduction of the lens material into the female mold half. Since the orientation mark is always applied to the female mold half at the same position, the female mold half should not be rotated, otherwise the 0° mark would be at the wrong position. This listing is not exhaustive but merely is intended to illustrate that the invention can be performed in a number of other variants without departing from the spirit and scope of the invention, which is defined in the appended claims.

The invention claimed is:
1. Process for the automatic manufacturing of different toric optical lenses, each lens having a front surface and a rear surface with the front and rear surfaces having a predetermined rotational orientation relative to one another, and with at least one of the front and rear surfaces having a toric portion, in which process a first toric lens is formed by
   introducing a starting material into a respective lens mold comprising a male mold half and a female mold half defining a mold cavity between the shaping surfaces of the male and female mold halves, the shaping surfaces being arranged at a first rotational position relative to one another and at least one of them being toric, wherein the male mold half is arranged in a cylindrical clamping sleeve and the female mold half is arranged in a cylindrical clamping sleeve, and
   curing the starting material in the mold cavity to form the first toric lens having front and rear surfaces having a first predetermined rotational orientation relative to one another;
and in which process subsequently a second toric lens different from the first toric contact lens is formed using the same male and female mold halves by rotating the first and second mold halves relative to one another from the first rotational position so as to be arranged at a second rotational position relative to one another, introducing the starting material into the mold cavity defined between the shaping surfaces of the male and female mold halves, and curing the starting material in the mold cavity to form the second toric lens having front and rear surfaces having a second predetermined rotational orientation relative to one another;

wherein the step of rotating the male and female mold halves relative to one another from the first rotational position to the second rotational position is performed automatically in the production line.

2. The process according to claim 1, wherein a plurality of male and female mold halves is provided and wherein the step of rotating the first and second mold halves relative to one another comprises simultaneously rotating at least two male and female mold halves from the first rotational position to the second rotational position.

3. The process according to claim 2, wherein the male and female mold halves are arranged in two rows and a plurality of columns with the male and female mold halves of the same column being arranged at the same first rotational position, and wherein the step of simultaneously rotating the male and female mold halves relative to one another comprises simultaneously rotating the male and female mold halves of the same column from the first rotational position to the second rotational position.

4. The process according to claim 3, wherein the male and female mold halves are arranged in a mold carrier in two rows and five columns, and wherein the step of simultaneously rotating the male and female mold halves relative to one another comprises simultaneously rotating all male mold halves and female mold halves arranged in the mold carrier.

5. The process according to claim 1, wherein at least one of the male and female mold halves of a mold is provided with an adapter member having means indicative of the rotational position of the shaping surface of the respective male or female mold half and engaging the respective male or female mold half, and wherein the step of rotating the male and female mold halves relative to one another comprises engaging the adapter member and rotating it by a predetermined angle thus rotating the respective male or female mold half.

6. The process according to claim 2, wherein at least one of the male and female mold halves of a mold is provided with an adapter member having means indicative of the rotational position of the shaping surface of the respective male or female mold half and engaging the respective male or female mold half, and wherein the step of rotating the male and female mold halves relative to one another comprises engaging the adapter member and rotating it by a predetermined angle thus rotating the respective male or female mold half.

7. The process according to claim 3, wherein at least one of the male and female mold halves of a mold is provided with an adapter member having means indicative of the rotational position of the shaping surface of the respective male or female mold half and engaging the respective male or female mold half, and wherein the step of rotating the male and female mold halves relative to one another comprises engaging the adapter member and rotating it by a predetermined angle thus rotating the respective male or female mold half.

8. The process according to claim 4, wherein at least one of the male and female mold halves of a mold is provided with an adapter member having means indicative of the rotational position of the shaping surface of the respective male or female mold half and engaging the respective male or female mold half, and wherein the step of rotating the male and female mold halves relative to one another comprises engaging the adapter member and rotating it by a predetermined angle thus rotating the respective male or female mold half.

9. Apparatus for the automatic manufacturing of different toric optical lenses, each lens having a front surface and a rear surface with the front and rear surfaces having a predetermined rotational orientation relative to one another, and with at least one of the front and rear surfaces having a toric portion, the apparatus comprising dispensing means for introducing a starting material into a respective lens mold comprising a male mold half and a female mold half defining a mold cavity between the shaping surfaces of the male and female mold halves, the shaping surfaces being arranged at a first rotational position relative to one another and at least one of them being toric, and wherein the male mold half is arranged in a cylindrical clamping sleeve and the female mold half is arranged in a cylindrical clamping sleeve;

means for curing the starting material in the mold cavity to form a first toric lens having front and rear surfaces having a first predetermined rotational orientation relative to one another, and means for rotating the male and female mold halves relative to one another so as to be arranged at a second rotational position relative to one another after rotation, so that a second toric lens having front and rear surfaces having a second predetermined rotational orientation relative to one another can be manufactured using the same mold halves, wherein the means for rotating the male and female mold halves relative to one another from the first rotational position to the second rotational position are arranged such that rotation of the male and female mold halves relative to one another is performed automatically in the production line.

10. The apparatus according to claim 9, comprising a mold carrier for providing a plurality of male and female mold halves, and wherein the means for rotating the first and second mold halves relative to one another comprise at least two rotating units for simultaneously rotating at least two male and female mold halves from the first rotational position to the second rotational position.

11. The apparatus according to claim 10, wherein the mold carrier is designed such that the male and female mold halves are arranged in two rows and a plurality of columns with the male and female mold halves of the same column being arranged at the same first rotational position, and wherein the at least two rotating units for simultaneously rotating the male and female mold halves from the first rotational position to the second rotational position are arranged such that they are capable of rotating the male and female mold halves of the same column.

12. The apparatus according to claim 11, wherein the mold carrier is designed such that the male and female mold halves are arranged in the mold carrier in two rows and five columns, and wherein the means for rotating the male and female mold halves relative to one another comprises ten rotating units for simultaneously rotating all male mold halves and female mold halves arranged in the mold carrier.

13. The apparatus according to claim 9, wherein at least one of the male and female mold halves of a mold is provided with an adapter member having means indicative of the rotational position of the shaping surface of the respective male or female mold half and engaging the respective male or female mold half, the means being indicative of the rotational position of the shaping surface of the respective male or female mold half being capable of getting engaged by corresponding engagement means provided at the means for rotating the male and female mold halves.

14. The apparatus according to claim 10, wherein at least one of the male and female mold halves of a mold is provided with an adapter member having means indicative of the rotational position of the shaping surface of the respective male or female mold half and engaging the respective male or female mold half, the means being indicative of the rotational position of the shaping surface of the respective male or female mold half being capable of getting engaged by corresponding engagement means provided at the means for rotating the male and female mold halves.

15. The apparatus according to claim 11, wherein at least one of the male and female mold halves of a mold is provided with an adapter member having means indicative of the rotational position of the shaping surface of the respective male or female mold half and engaging the respective male or female mold half, the means being indicative of the rotational position of the shaping surface of the respective male or female mold half being capable of getting engaged by corresponding engagement means provided at the means for rotating the male and female mold halves.

16. The apparatus according to claim 12, wherein at least one of the male and female mold halves of a mold is provided with an adapter member having means indicative of the rotational position of the shaping surface of the respective male or female mold half and engaging the respective male or female mold half, the means being indicative of the rotational position of the shaping surface of the respective male or female mold half being capable of getting engaged by corresponding engagement means provided at the means for rotating the male and female mold halves.

17. The apparatus according to claim 13, wherein the adapter member is an adapter ring, and wherein the means indicative of the rotational position of the shaping surface of the respective male or female mold half are recesses provided on the adapter ring at a position which is angularly displaced relative to the position where the adapter ring engages the respective male or female mold half, and wherein the corresponding engagement means are protrusions provided on the means for rotating the male and female mold halves mating into the recesses of the adapter ring.

18. The apparatus according to claim 14, wherein the adapter member is an adapter ring, and wherein the means indicative of the rotational position of the shaping surface of the respective male or female mold half are recesses provided on the adapter ring at a position which is angularly displaced relative to the position where the adapter ring engages the respective male or female mold half, and wherein the corresponding engagement means are protrusions provided on the means for rotating the male and female mold halves mating into the recesses of the adapter ring.

19. The apparatus according to claim 15, wherein the adapter member is an adapter ring, and wherein the means indicative of the rotational position of the shaping surface of the respective male or female mold half are recesses provided on the adapter ring at a position which is angularly displaced relative to the position where the adapter ring engages the respective male or female mold half, and wherein the corresponding engagement means are protrusions provided on the means for rotating the male and female mold halves mating into the recesses of the adapter ring.

20. The apparatus according to claim 16, wherein the adapter member is an adapter ring, and wherein the means indicative of the rotational position of the shaping surface of the respective male or female mold half are recesses provided on the adapter ring at a position which is angularly displaced relative to the position where the adapter ring engages the respective male or female mold half, and wherein the corresponding engagement means are protrusions provided on the means for rotating the male and female mold halves mating into the recesses of the adapter ring.

* * * * *